E. E. WICKERSHAM.
TRACTOR.
APPLICATION FILED MAY 26, 1920.
1,371,716.
Patented Mar. 15, 1921.
2 SHEETS—SHEET 1.
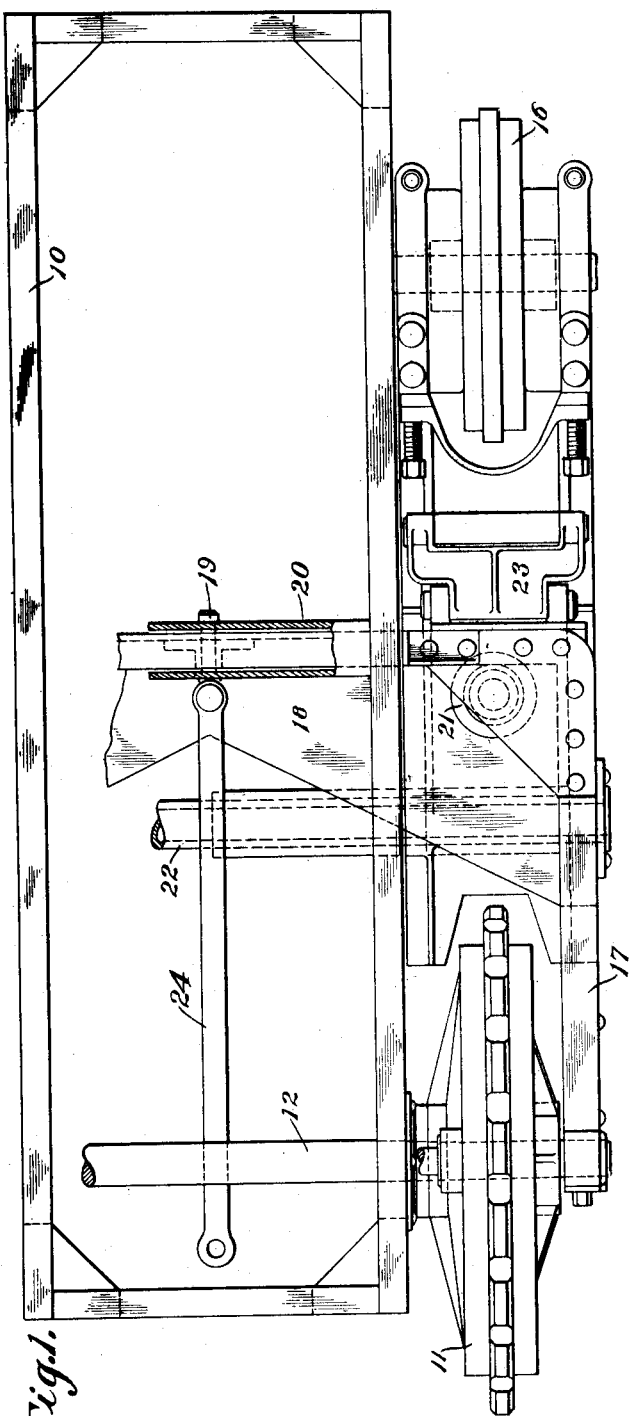
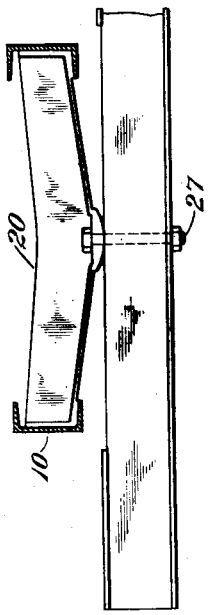
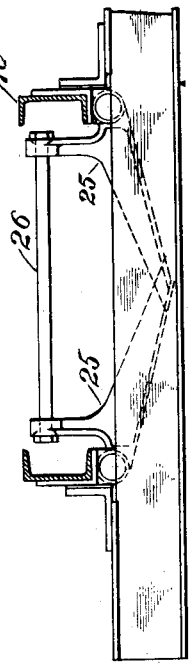
INVENTOR.
*Elmer E. Wickersham.*
BY *Chas. E. Townsend*
ATTORNEY E. E. WICKERSHAM.
TRACTOR.
APPLICATION FILED MAY 26, 1920.
1,371,716.
Patented Mar. 15, 1921.
2 SHEETS—SHEET 2.
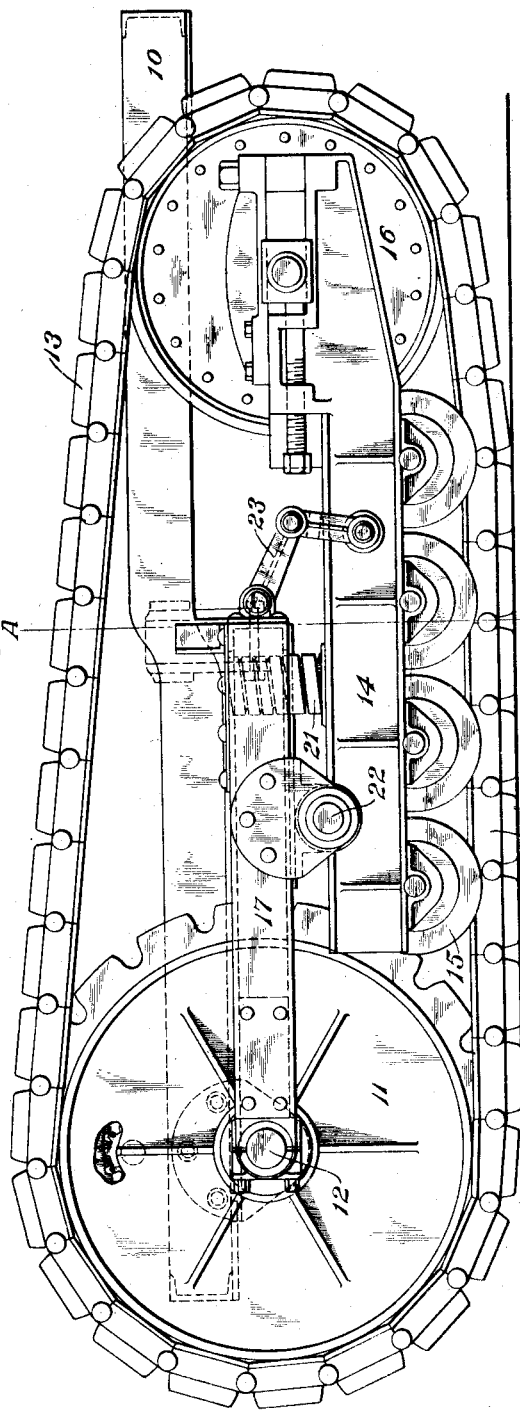
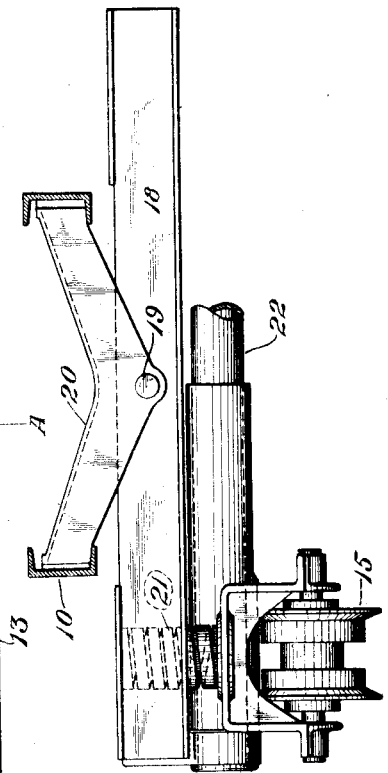
INVENTOR.
Elmer E. Wickersham.
BY Chas E. Townsend
ATTORNEY

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR.

1,371,716. Specification of Letters Patent. Patented Mar. 15, 1921.

Application filed May 26, 1920. Serial No. 384,343.

*To all whom it may concern:*

Be it known that I, ELMER E. WICKERSHAM, a citizen of the United States, residing at Stockton, in the county of San Joaquin and State of California, have invented a new and useful Improvement in Tractors, of which the following is a specification.

This invention relates to tractors of the self-laying track type and more particularly to means for supporting the weight of the main frame upon the roller truck mechanism.

The object is to simplify and improve the construction and operation of the means above mentioned. In carrying out this object, I employ a horizontally disposed U-shaped supplemental frame member arranged between the main frame and the roller truck frames, the legs of the supplemental frame being pivotally connected to the axle of the driving sprocket wheels and extending forwardly to a point near the middle of the main frame where a transverse member connects the opposite legs together and rests upon springs carried by the truck frames. The said transverse member has a pivotal connection at its middle with the overlying main frame and each leg of the supplemental frame is pivotally connected to the adjacent truck frame by means of a transversely extending stabilizer shaft. The said supplemental frame member allows free rocking movement of the truck frames independently of each other without imparting any considerable movement to the main frame. It further provides an efficient thrust connection between the main frame and the roller truck frames and also affords a means for connecting a draft bar thereto.

In the accompanying drawings,

Figure 1 shows a partial plan view of a tractor embodying my invention

Fig. 2 shows a side elevation of the same.

Fig. 3 shows a sectional view taken on the line *a—a* of Fig. 2

Figs. 4 and 5 show detail sectional views illustrating modifications in the way of supporting connections between the main frame and the transverse member of the supplemental frame.

Referring more in detail to the accompanying drawings, I show a tractor main frame 10 at each side of which is a track-laying unit, each unit including a sprocket driving wheel 11 journaled on an axle 12 carried by the main frame. An endless track 13 is shown arranged upon the driving sprocket wheel and within said track is a truck frame 14 carrying a series of rollers 15 operating upon the ground stretch of the track. An idler or guide wheel 16 for the forward portion of the endless track is shown journaled upon the truck frame 14.

A supplemental frame 17 in the form of a U is pivoted to the axle 12 and extends forwardly and has its transverse portion 18 pivoted at 19 to a cross-sill 20 of the main frame. The supplemental frame rests on springs 21 carried by each truck frame and there is a pivotal connection between each leg of the U-shaped frame and a stabilizing shaft 22 carried between opposite truck frames. To pivotally guide the forward portion of the truck frames, I provide link connections 23 extending forwardly from the front end of the supplemental frame and connecting with each truck frame. A draft bar 24 is shown as being pivotally connected to the center of the transverse member of the supplemental frame.

In Fig. 4, I show pivot arms 25 extending down from each side of the main frame to a central point on the transverse member of the supplemental frame, opposite arms being cross-connected by a bolt 26. In Fig. 5 I show a single vertically extending bolt 27 connecting the main frame to the supplemental frame. Obviously other means for connecting the main frame to the supplemental frame may be employed which preferably should include a single point of support in order that the strains and weight may be evenly distributed. This single point of support in connection with the pivotal connection between each leg of the supplemental frame and the axle constitutes a three-point bearing for the main frame.

The mechanism above described allows each truck member to rock independently of the other in order to conform to the contour of the ground. This rocking movement is transmitted but slightly to the main frame on account of the close arrangement between the pivot shaft 22 and the springs 21. The latter will yield sufficiently when the trucks move upwardly at their forward ends to prevent undue twisting strains or movements being imparted to the main frame. The U-shaped supplemental frame greatly strengthens the structure throughout and provides an efficient thrust connection between the main frame and the truck frames. Also it affords an ideal connection for a draft bar. The link connections 23 are not designed to carry any weight, but act merely as guides or stabilizers to keep the forward ends of the truck frames in proper alinement.

Various changes in the construction and arrangement of the several parts may be employed without departing from the spirit of my invention as disclosed in the appended claims.

Having thus described my invention, what I claim and desire to secure by Letters Patent is:

1. In a tractor, a main frame, a self-laying track unit at each side thereof, including a roller truck frame, a driving sprocket wheel journaled on the main frame for operating each track, and a connection between the main frame and the roller truck frames comprising a horizontally disposed U-shaped supplemental frame, each leg of which is pivotally connected to the axle of the driving sprocket wheels and extends forwardly where a transverse member passes beneath the main frame centrally thereof, a supporting connection between the main frame and the transverse member, a pivotal connection between each leg and the adjacent truck frame near the rear end of the latter, and supporting springs between the supplemental frame and the truck frames arranged forwardly of the pivotal connection.

2. The combination set forth in claim 1, wherein the pivotal connection between the legs of the supplemental frame and the truck frames is formed by a cross-shaft which connects opposite truck frames together.

3. The combination set forth in claim 1, wherein the connection between the main frame and the transverse member comprises a single point of support arranged centrally thereof.

4. The combination set forth in claim 1 to which is added a forwardly extending link connection between the front of the supplemental frame and each truck frame for assisting in maintaining said trucks in alinement.

In testimony whereof I have hereunto set my hand in the presence of two subscribing witnesses.

ELMER E. WICKERSHAM.

Witnesses:
W. W. HEALEY,
JOHN H. HERRING.